(12) United States Patent
Arai et al.

(10) Patent No.: US 10,217,973 B2
(45) Date of Patent: Feb. 26, 2019

(54) PRISMATIC SECONDARY BATTERY

(71) Applicant: SANYO ELECTRIC CO., LTD., Daito-shi, Osaka (JP)

(72) Inventors: Tomoharu Arai, Hyogo (JP); Tetsuya Okado, Hyogo (JP); Shinichirou Yoshida, Hyogo (JP); Masashi Muraoka, Hyogo (JP); Toyoki Fujihara, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 0 days.

(21) Appl. No.: 15/711,031

(22) Filed: Sep. 21, 2017

(65) Prior Publication Data

US 2018/0097206 A1 Apr. 5, 2018

(30) Foreign Application Priority Data

Sep. 30, 2016 (JP) ................................ 2016-194546

(51) Int. Cl.
| | |
|---|---|
| *H01M 2/02* | (2006.01) |
| *H01M 2/26* | (2006.01) |
| *H01M 4/66* | (2006.01) |
| *H01M 2/04* | (2006.01) |

(Continued)

(52) U.S. Cl.
CPC ....... *H01M 2/0217* (2013.01); *H01M 2/0207* (2013.01); *H01M 2/0277* (2013.01); *H01M 2/0426* (2013.01); *H01M 2/263* (2013.01); *H01M 4/661* (2013.01); *H01M 4/662* (2013.01);

(Continued)

(58) Field of Classification Search
CPC ........... H01M 2/0217; H01M 10/0587; H01M 10/0436; H01M 2/0426; H01M 4/661; H01M 2/263; H01M 2/0207; H01M 4/662; H01M 2/0277
See application file for complete search history.

(56) References Cited

U.S. PATENT DOCUMENTS

| | | |
|---|---|---|
| 2009/0202900 A1 | 8/2009 | Kuroda et al. |
| 2011/0111275 A1 | 5/2011 | Kawase |
| 2016/0181589 A1 | 6/2016 | Yokoyama et al. |

(Continued)

FOREIGN PATENT DOCUMENTS

| | | |
|---|---|---|
| JP | 2010-287456 A | 12/2010 |
| JP | 2015-79617 A | 4/2015 |
| JP | 2016-119210 A | 6/2016 |

*Primary Examiner* — Stewart A Fraser
(74) *Attorney, Agent, or Firm* — Westerman, Hattori, Daniels & Adrian, LLP

(57) ABSTRACT

A prismatic secondary battery includes a first current collector and a second current collector. The first current collector includes a first base disposed along a sealing plate. The second current collector includes a second base disposed along the sealing plate. A distance between an end portion of a wound electrode body facing the sealing plate and a surface of the first base facing the wound electrode body at an end portion of the first base on a central side in the longitudinal direction of the sealing plate is shorter than a distance between the end portion of the wound electrode body facing the sealing plate and a surface of the second base facing the wound electrode body at an end portion of the second base on the central side. An insulating buffer is disposed between the wound electrode body and the above surface of the first base.

7 Claims, 9 Drawing Sheets

(51) Int. Cl.
*H01M 10/04* (2006.01)
*H01M 10/0587* (2010.01)
(52) U.S. Cl.
CPC ... *H01M 10/0436* (2013.01); *H01M 10/0587* (2013.01)

(56) References Cited

U.S. PATENT DOCUMENTS

2017/0092980 A1* 3/2017 Wakimoto .......... H01M 2/0217
2018/0062152 A1* 3/2018 Yoshida ................ H01M 2/347

* cited by examiner

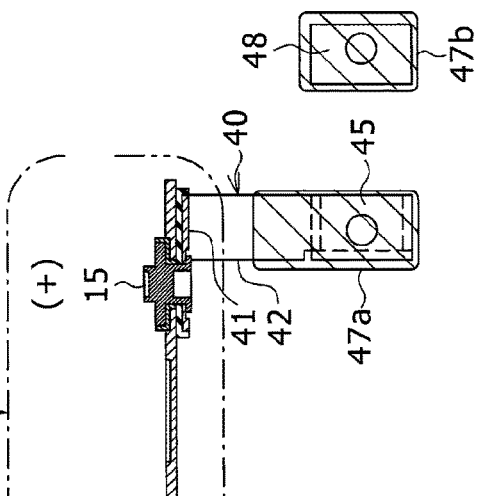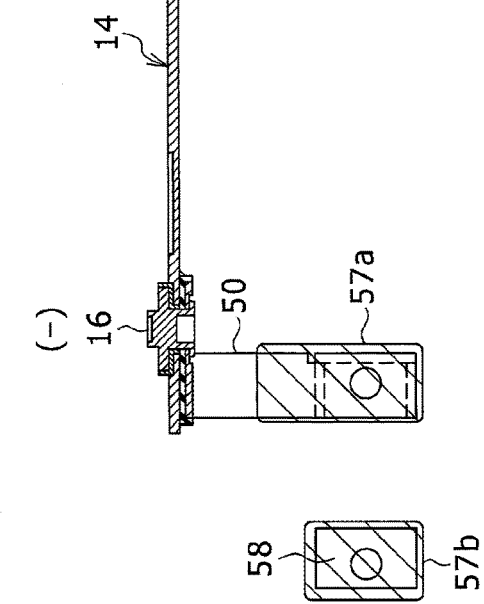

PRISMATIC SECONDARY BATTERY

CROSS REFERENCE TO RELATED APPLICATIONS

The present invention application claims priority to Japanese Patent Application No. 2016-194546 filed in the Japan Patent Office on Sep. 30, 2016, the entire contents of which are incorporated herein by reference.

BACKGROUND OF THE INVENTION

Field of the Invention

The present disclosure relates to a prismatic secondary battery.

Description of Related Art

In a prismatic secondary battery known as a non-aqueous electrolyte secondary battery, a wound electrode body, which is a flat power generation element obtained by winding a positive-electrode sheet and a negative-electrode sheet with a separator interposed therebetween, is contained in an exterior body, and an opening of the exterior body is closed by a sealing plate.

Japanese Published Unexamined Patent Application No. 2016-119210 (Patent Document 1) discloses a prismatic secondary battery in which a first region of a positive-electrode current collector is disposed parallel to a sealing body near the sealing body, two second regions of the positive-electrode current collector extend from both sides of the first region to both side surfaces of a wound electrode body in the thickness direction. An exposed positive-electrode core portion is formed along an end portion of a positive-electrode sheet forming the wound electrode body.

The two second regions are connected to the exposed positive-electrode core portion by welding.

BRIEF SUMMARY OF THE INVENTION

A current collector including a base disposed along the sealing plate and a lead extending from an end portion of the base toward the electrode body is used for the above prismatic secondary batter. The base of the current collector is secured to the sealing plate with an insulating member interposed therebetween. The lead of the current collector is connected to the wound electrode body. In the case where the weight of the wound electrode body of such a prismatic secondary battery is light, a current collector including a lead mounted to a base is used. In the case where the weight of the wound electrode body is heavy, a current collector including leads mounted to a base is used.

The present inventors have developed prismatic secondary batteries and found that a prismatic secondary battery having a specific structure is likely to cause a short circuit of positive and negative electrodes of the electrode body in the case where the prismatic secondary battery is dropped in a state where a surface on which positive and negative terminals are disposed faces downward.

It is an object of the present disclosure to suppress an internal short circuit when a non-aqueous electrolyte secondary battery is dropped.

A prismatic secondary battery according to an embodiment of the present disclosure includes a first electrode sheet including a first exposed core portion, a second electrode sheet including a second exposed core portion, a flat wound electrode body obtained by winding the first electrode sheet and the second electrode sheet with a separator interposed therebetween and winding a separator as an outermost layer, a non-aqueous electrolyte solution, an exterior body that has an opening and that contains the wound electrode body and the non-aqueous electrolyte solution, a sealing plate that closes the opening, a first current collector connected to the first exposed core portion, a second current collector connected to the second exposed core portion, a first terminal that is connected to the first current collector and that is mounted in the sealing plate, and a second terminal that is connected to the second current collector and that is mounted in the sealing plate. A winding axis of the wound electrode body is parallel to a longitudinal direction of the sealing plate. The first exposed core portion is disposed along an end portion of the wound electrode body in a direction in which the winding axis extends, and the second exposed core portion is disposed along the other end portion. The first current collector includes a first base disposed along the sealing plate and a first lead that is connected to an end portion of the first base and that extends toward the wound electrode body. The second current collector includes a second base disposed along the sealing plate and a second lead that is connected to an end portion of the second base and that extends toward the wound electrode body. The first leas is connected to the first exposed core portion. The second lead is connected to the second exposed core portion. A distance between an end portion of the wound electrode body facing the sealing plate and a surface of the first base facing the wound electrode body at an end portion of the first base on a central side in the longitudinal direction of the sealing plate is shorter than a distance between the end portion of the wound electrode body facing the sealing plate and a surface of the second base facing the wound electrode body at an end portion of the second base on the central side in the longitudinal direction of the sealing plate. An insulating buffer that differs from the separators is disposed between the wound electrode body and the surface of the first base facing the wound electrode body at the end portion of the first base on the central side in the longitudinal direction of the sealing plate.

The present inventors have found that a short circuit of the positive and negative terminals is likely to occur when the prismatic secondary battery is dropped in a state where the surface on which the positive and negative terminals are disposed faces downward in the case where the sum of the mass of the wound electrode body and the mass of the non-aqueous electrolyte solution contained in the wound electrode body is 200 g or more, and the distance between the end portion of the wound electrode body facing the sealing plate and the surface of the first base facing the wound electrode body at the end portion of the first base on the central side in the longitudinal direction of the sealing plate is shorter than the distance between the end portion of the wound electrode body facing the sealing plate and the surface of the second base facing the wound electrode body at the end portion of the second base on the central side in the longitudinal direction of the sealing plate. Further consideration reveals that a short circuit of the positive and negative terminals occurs at a portion of the wound electrode body that faces the end portion of the first base on the central side in the longitudinal direction of the sealing plate. The present invention has been accomplished on the basis of the above knowledge.

With the above structure, since the insulating buffer that differs from the separators is disposed between the wound electrode body and the end portion of the first base on the central side in the longitudinal direction of the sealing plate, a short circuit of the positive and negative terminals can be prevented from occurring when the prismatic secondary battery having the above structure is dropped in a state where the surface on which the positive and negative terminals are disposed faces downward.

The prismatic secondary battery according to the embodiment of the present disclosure can suppress an internal short circuit when dropped.

BRIEF DESCRIPTION OF THE SEVERAL VIEWS OF THE DRAWINGS

FIG. 5A is a sectional view of a structure connecting a sealing plate, a positive terminal, a negative terminal, a positive-electrode current collector, and a negative-electrode current collector that is extracted from FIG. 1.

FIG. 5B illustrates a receiving member and an insulating film opposite the positive-electrode current collector with a wound electrode body interposed therebetween.

FIG. 5C illustrates a receiving member and an insulating film opposite the negative-electrode current collector with the wound electrode body interposed therebetween.

DETAILED DESCRIPTION OF THE INVENTION

A prismatic secondary battery according to an embodiment will hereinafter be described in detail. The meaning of the term "substantially" in the description is such that, in the case where the phrase "substantially the same" is taken as an example, the meaning includes not only "substantially the same" but also "completely the same". The term "end portion" means an end of an object and the vicinity thereof. In the following description, shapes, materials, numbers, and numeral values are examples for description and can be changed in accordance with the specification of the prismatic secondary battery. In the following description, like components are designated by like reference numbers.

Examples of the prismatic secondary battery described below include a non-aqueous electrolyte secondary battery used for, for example, a driving power supply of an electric vehicle or a hybrid vehicle.

Figure 1:
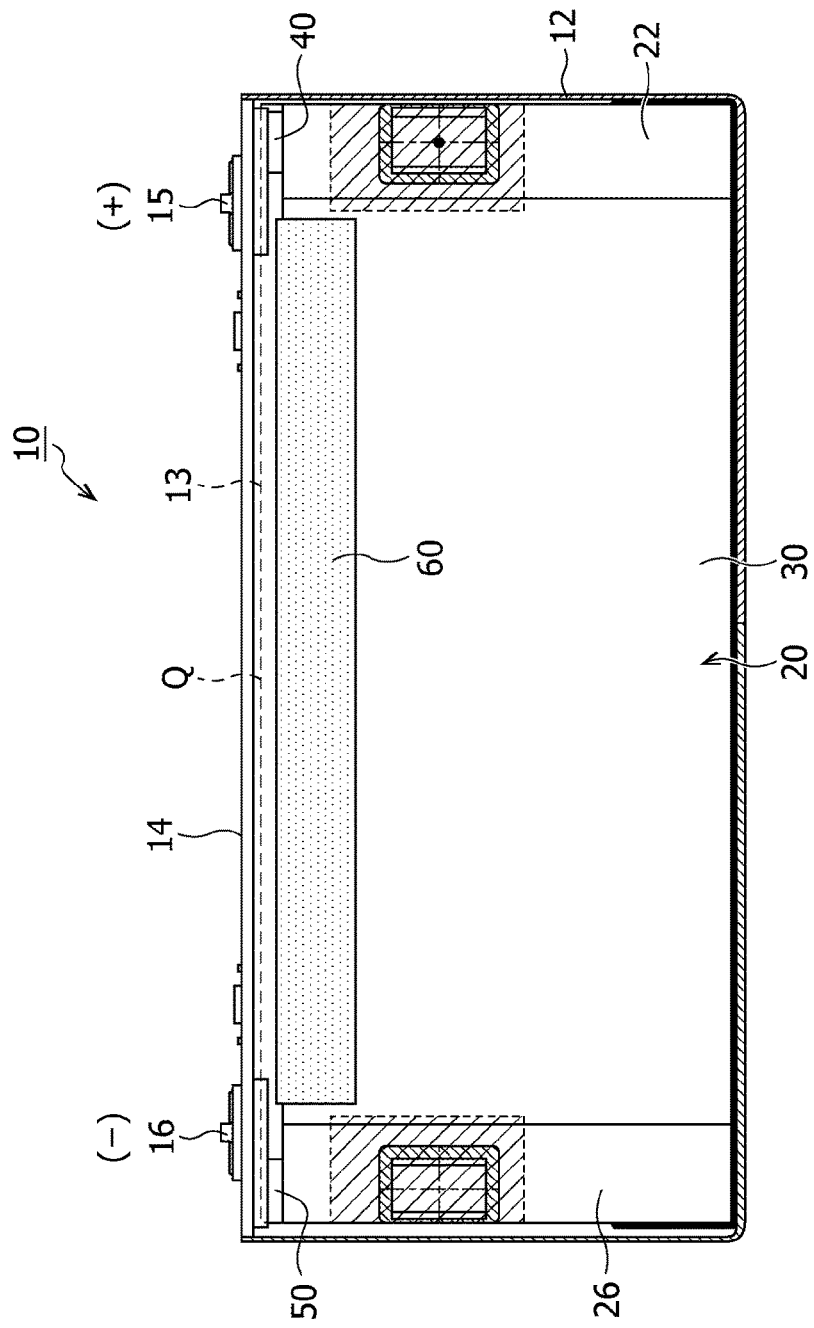
FIG. 1 is a sectional view of an exterior body of a prismatic secondary battery according to an embodiment.
Figure 2:
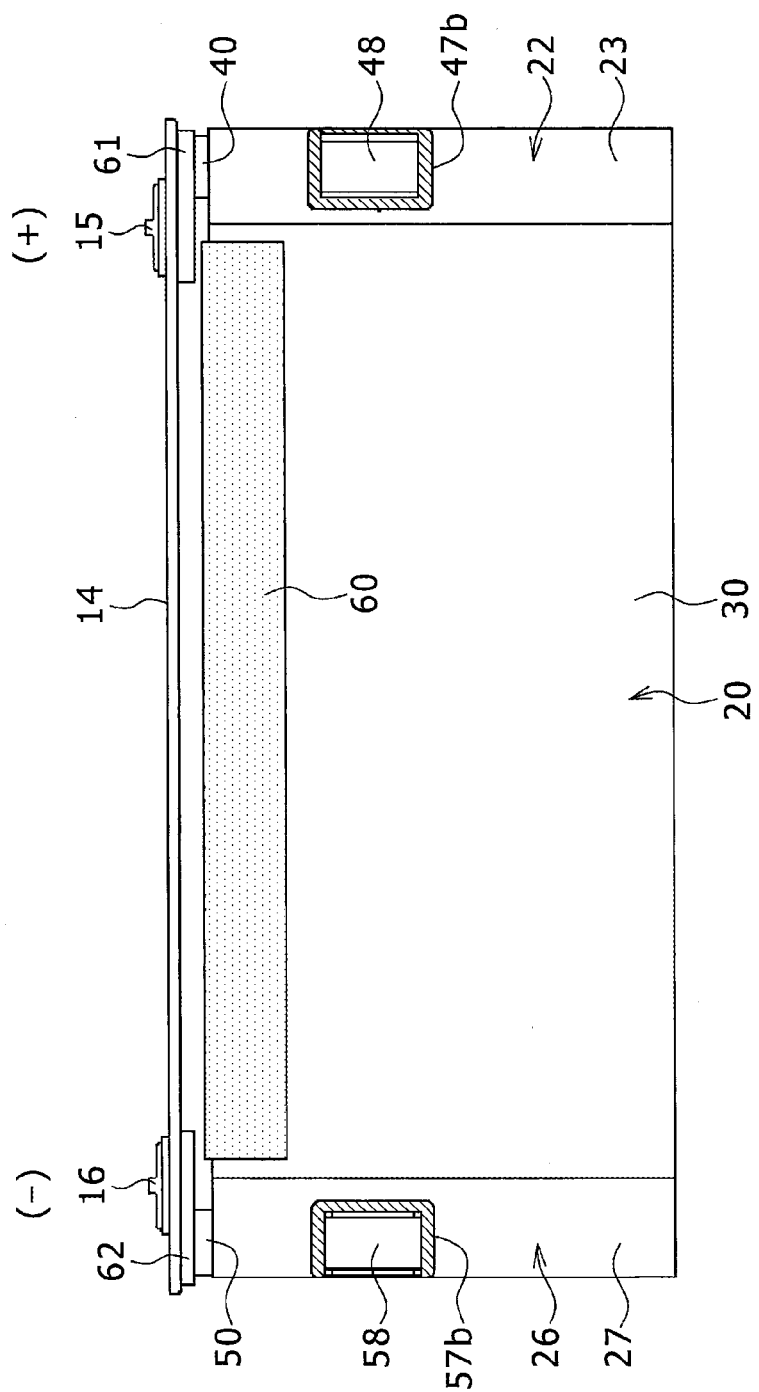
FIG. 2 illustrates the prismatic secondary battery in FIG. 1 with the exterior body removed.
Figure 3:
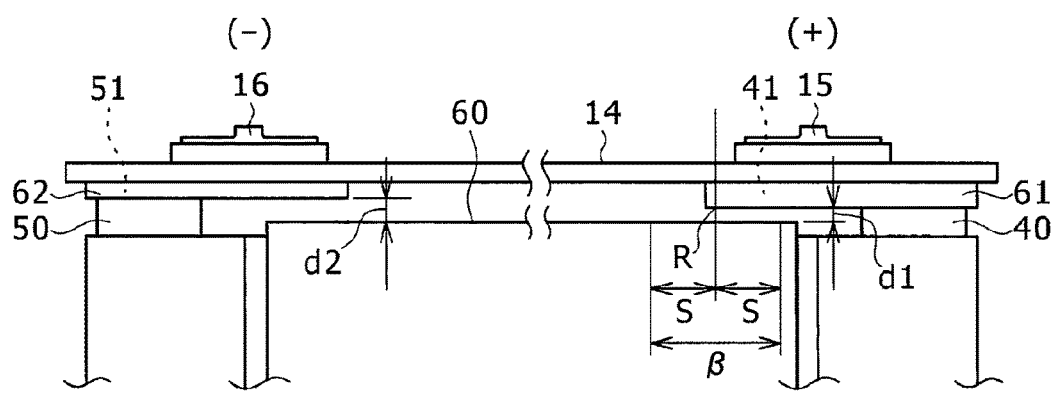
FIG. 3 is an enlarged view of an upper portion in FIG. 2.
Figure 4:
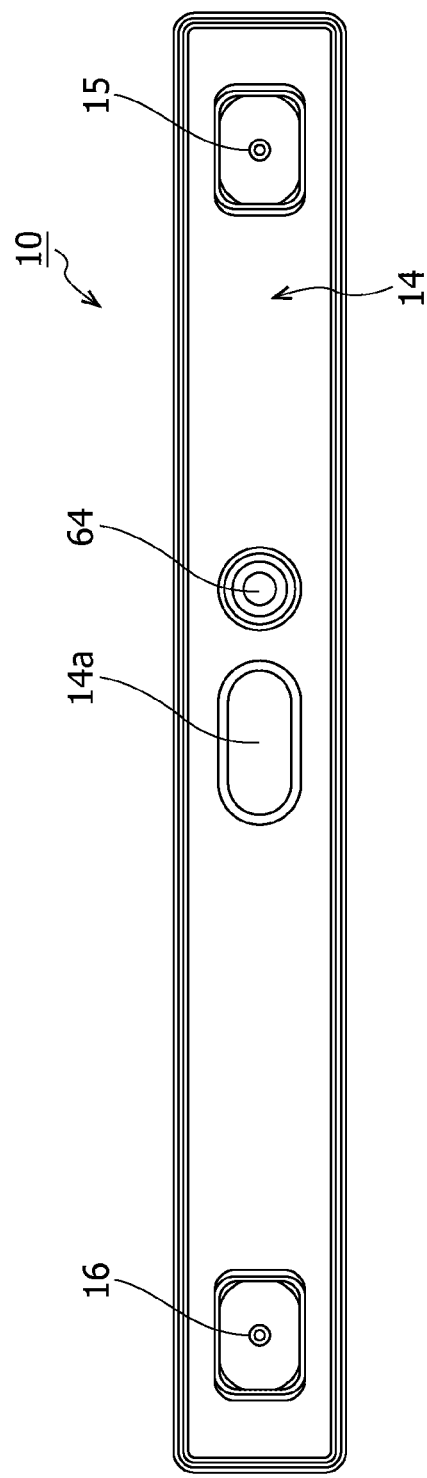
FIG. 4 illustrates the prismatic secondary battery in FIG. 1 from a sealing plate side.

The prismatic secondary battery according to the embodiment will now be described with reference to the drawings. FIG. 1 is a sectional view of an exterior body 12 of a prismatic secondary battery 10. FIG. 2 illustrates the prismatic secondary battery 10 in FIG. 1 with the exterior body 12 removed. FIG. 3 is an enlarged view of an upper portion in FIG. 2. FIG. 4 illustrates the prismatic secondary battery in FIG. 1 from the side of a sealing plate 14. The prismatic secondary battery 10 is referred to below as the secondary battery 10. In the following description of FIG. 1 to FIG. 8B, a side of the exterior body 12 on which the sealing plate 14 is disposed is referred to as an upper side, and the side opposite the sealing plate 14 is referred to as a lower side for convenience.

The secondary battery 10 includes the exterior body 12 as a case and a wound electrode body 20 as a power generation element disposed inside the exterior body 12. The exterior body 12 contains a non-aqueous electrolyte solution. Examples of the non-aqueous electrolyte solution include an electrolyte solution containing lithium salt and having lithium-ion conductivity. In some descriptions below, the wound electrode body 20 is referred to as the electrode body 20.

Figures 8A, 8B:
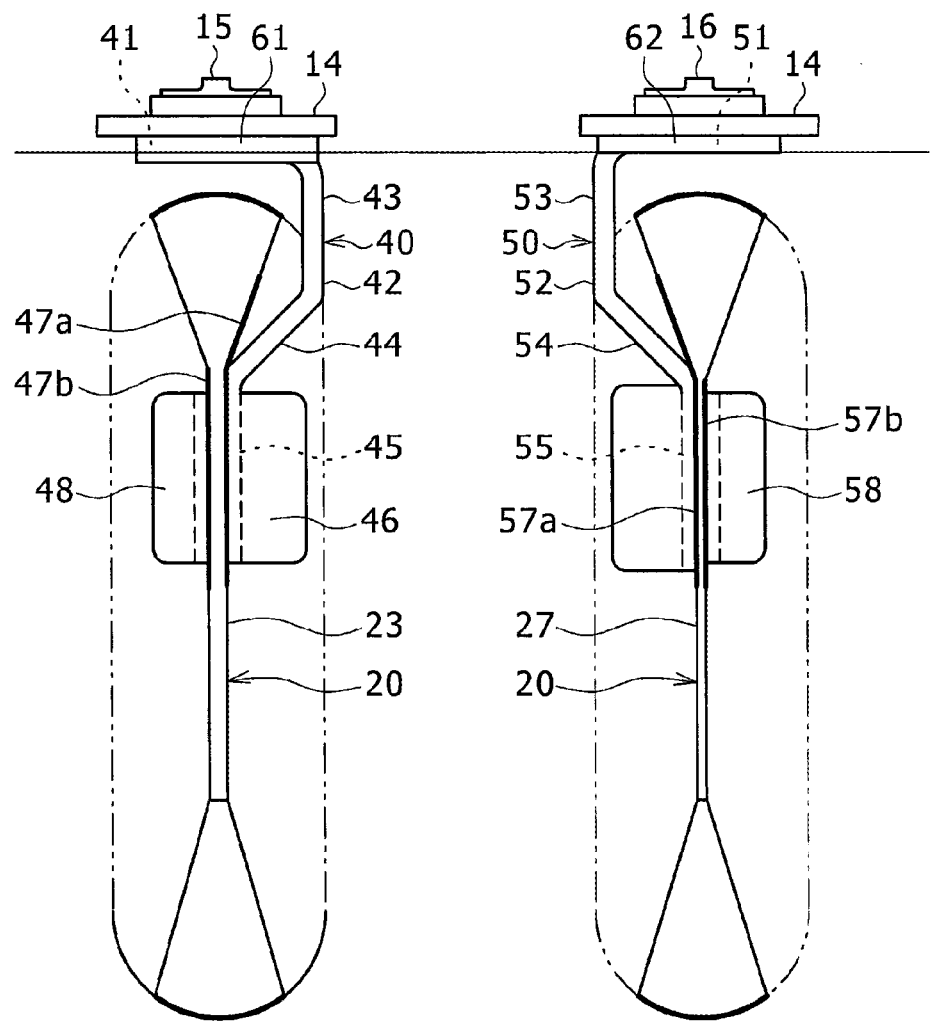
FIG. 8A illustrates the electrode body and other components in FIG. 2 from the right-hand side.
FIG. 8B illustrates the electrode body and other components in FIG. 2 from the left-hand side.

The electrode body 20 is a flat wound electrode body obtained by winding a positive-electrode sheet 22 as a first electrode sheet and a negative-electrode sheet 26 as a second electrode sheet with a separator 30 interposed therebetween. In the electrode body 20, for example, the positive-electrode sheet 22 elongated, the separator 30 elongated, the negative-electrode sheet 26 elongated, and another separator 30 elongated are stacked and wound, and the other separator 30 is wound as the outermost layer. As illustrated in FIGS. 8A and 8B described later, the end portion of the electrode body 20 facing the sealing plate 14 and the opposed end portion in the vertical direction each have an arc shape in section.

As illustrated in FIG. 1, the exterior body 12, which is made of a metal, has a box shape having an opening at the upper end thereof. The secondary battery 10 includes the sealing plate 14 that closes the opening and is formed of a metallic elongated plate. The exterior body 12 and the sealing plate 14 can be made of aluminum or aluminum alloy. A positive terminal 15 protrudes upward from an end portion (right end portion in FIG. 1) of the sealing plate 14 in the longitudinal direction. A negative terminal 16 protrudes upward from the other end portion (left end portion in FIG. 1) of the sealing plate 14 in the longitudinal direction. The positive terminal 15 and the negative terminal 16 are mounted so as to be inserted in two through-holes formed in the sealing plate 14 and so as to be secured to the sealing plate 14 with resin gaskets interposed therebetween. The winding axis of the electrode body 20 is parallel to the longitudinal direction (left and right direction in FIG. 1 and FIG. 2) of the sealing plate 14. Inside the exterior body 12, an insulating sheet 13, which is bent into the form of a box containing a portion denoted by a dashed line Q in FIG. 1, covers the periphery of the electrode body 20 so that the electrode body 20 and the exterior body 12 are insulated from each other. The insulating sheet 13 is not disposed between the sealing plate 14 and the electrode body 20. For this reason, the insulating sheet 13 is not disposed between a first base 41 of a positive-electrode current collector 40 described later and the electrode body 20 and between a second base 51 of a negative-electrode current collector 50 described later and the electrode body 20.

The positive-electrode sheet 22 is obtained by, for example, forming positive electrode active material mixture layers each containing a positive electrode active material on both surfaces of a positive-electrode core formed of an aluminum foil. A lithium transition metal oxide that enables insertion and extraction of lithium ions can be used as the positive electrode active material. Each of the positive electrode active material mixture layers preferably contains a binder and a conductive material other than the positive electrode active material. The positive-electrode sheet 22 includes an exposed positive-electrode core portion 23 as a first exposed core portion along an end portion in the width direction before being wound.

The negative-electrode sheet 26 is obtained by, for example, forming negative electrode active material mixture layers each containing a negative electrode active material on both surfaces of a negative-electrode core formed of a copper foil. For example, a carbon material or a silicon compound that enables insertion and extraction of lithium ions can be used as a negative electrode active material. Each of the negative electrode active material mixture layers preferably contains a binder other than the negative electrode active material. The negative-electrode sheet 26 includes an exposed negative-electrode core portion 27 as a second exposed core portion along an end portion in the width direction before being wound.

As illustrated in FIG. 2, the exposed positive-electrode core portion 23 that is wound is disposed along an end portion (right end portion in FIG. 2), which is a direction in which the winding axis extends. The exposed negative-electrode core portion 27 that is wound is disposed along the other end portion (left end portion in FIG. 2) of the electrode body 20 in the winding-axis direction. The separator 30 wound inside is disposed between the positive-electrode sheet 22 and the negative-electrode sheet 26 and electrically isolates the positive-electrode sheet 22 and the negative-electrode sheet 26 from each other. The separator 30 wound as the outermost layer prevents a short circuit between each outermost electrode sheet and a component on the outside. For example, in the electrode body 20, the outer separator 30 wound as the outermost layer, the negative-electrode sheet 26, the inner separator 30, the positive-electrode sheet 22, another outer separator 30, and another negative-electrode 26 are arranged in this order in the direction from the outermost layer to the inside, and this is repeated. In the case where a large force is applied to the wound electrode body 20 from the positive-electrode current collector 40 or the negative-electrode current collector 50 when the secondary battery is dropped as described later, there is a possibility that the outer separator 30 wound as the outermost layer is broken by the current collector. This creates a possibility that an inner electrode sheet and an outer component, for example, the positive-electrode current collector 40 and the negative-electrode sheet 26 come into contact with each other and short-circuit. According to the embodiment, such as inconvenience is prevented.

The end portion of the separator 30 wound as the outermost layer on the end side of winding is located along the upper end portion of the electrode body 20, which is an end portion facing the sealing plate 14 described later. An insulating tape 60 is attached to secure the end portion on the end side of winding to an outer circumferential portion of the electrode body 20. The insulating tape 60 is an insulating buffer that differs from each separator 30. The insulating tape 60 has the primary function of securing the winding of the electrode body 20 and also has a function of serving as a buffer material when the secondary battery is dropped. In FIG. 1 and FIG. 2, the insulating 60 is illustrated by stippling. The insulating tape 60 is attached to the upper end portion of the electrode body 20 so as to cover the end portion on the end side of winding from one side (front side of the page in FIG. 1 and FIG. 2) to the other side (back side of the page in FIG. 1 and FIG. 2) in the thickness direction. The insulating tape 60 extends over substantially the entire upper end portion of the electrode body 20 between the exposed positive-electrode core portion 23 and the exposed negative-electrode core portion 27 on both sides in the winding-axis direction. The insulating tape 60 is located between the electrode body 20 and a surface of the first base 41 (see FIG. 7 and FIG. 10) facing the electrode body 20 at an end portion of the first base 41 of the positive-electrode current collector 40 described later on the central side in the longitudinal direction of the sealing plate 14. This reduces the cost of the secondary battery 10 and suppresses an internal short circuit when the secondary battery is dropped, as described later.

The positive-electrode current collector 40 is electrically connected to the exposed positive-electrode core portion 23 (FIG. 2) that is wound. Thus, the positive-electrode current collector 40 is electrically connected to the positive-electrode sheet 22. The positive-electrode current collector 40 is integrally connected thereto by resistance welding with the exposed positive-electrode core portion 23 interposed between the positive-electrode current collector 40 and a positive-electrode receiving member 48 is disposed on the opposite side (front side of the page in FIG. 2) in the thickness direction of the electrode body 20. The positive-electrode current collector 40 is electrically connected at the first base 41 to the lower end portion of the positive terminal 15 extending in the vertical direction through a first insulating member 61 described later.

The negative-electrode current collector 50 is electrically connected to the exposed negative-electrode core portion 27 (FIG. 2) that is wound. Thus, the negative-electrode current collector 50 is electrically connected to the negative-electrode sheet 26. The negative-electrode current collector 50 is integrally connected thereto by resistance welding with the exposed negative-electrode core portion 27 interposed between the negative-electrode current collector 50 and a negative-electrode receiving member 58 disposed on the opposite side (front side of the page in FIG. 2) in the thickness direction of the electrode body 20. The negative-electrode current collector 50 is electrically connected at the second base 51 to the lower end portion of the negative terminal 16 extending in the vertical direction through a second insulating member 62. The positive-electrode current collector 40 and the negative-electrode current collector 50 will be described later in detail.

The opening of the exterior body 12 is closed by the sealing plate 14 welded to an edge portion around the opening. FIG. 5A is a sectional view of a structure connecting the sealing plate 14, the positive terminal 15, the negative terminal 16, the positive-electrode current collector 40, and the negative-electrode current collector 50 that is extracted from FIG. 1. FIG. 5B illustrates the positive-electrode receiving member 48 and an insulating film 47b opposite the positive-electrode current collector 40 with the electrode body 20 interposed therebetween. FIG. 5C illustrates the negative-electrode receiving member 58 and an insulating film 57b opposite the negative-electrode current collector 50 with the electrode body 20 interposed therebetween.

As illustrated in FIG. 4 and FIG. 5A, a gas exhausting valve 14a, which is broken and opened when a high gas pressure equal to or more than a predetermined pressure is applied thereto, is formed at the central portion of the sealing plate 14 in the longitudinal direction. A liquid inlet 14b is formed in the sealing plate 14 near the gas exhausting valve 14a. The liquid inlet 14b is used to pour the non-aqueous electrolyte solution into the exterior body 12.

Figure 6:
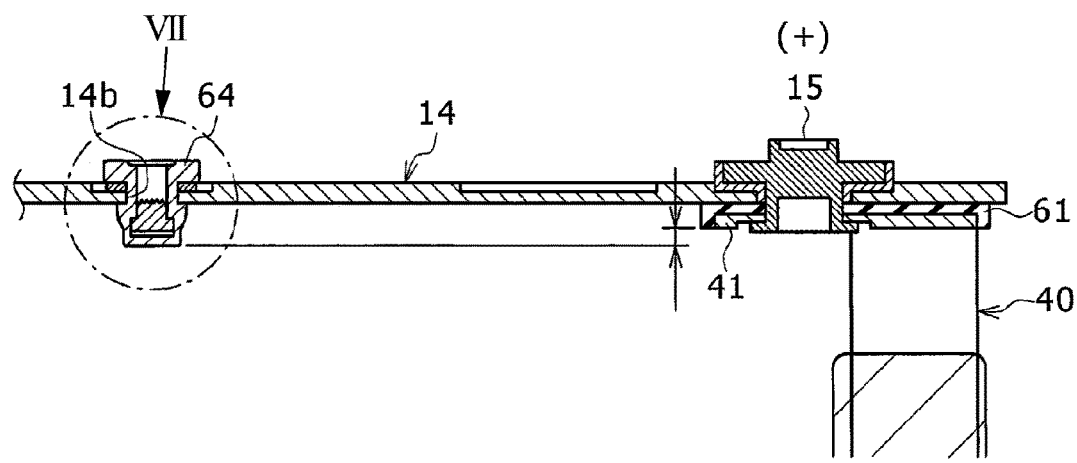
FIG. 6 is an enlarged view of a portion VI in FIG. 5A with a lid mounted in a liquid inlet of the sealing plate in FIG. 5A.
Figure 7:
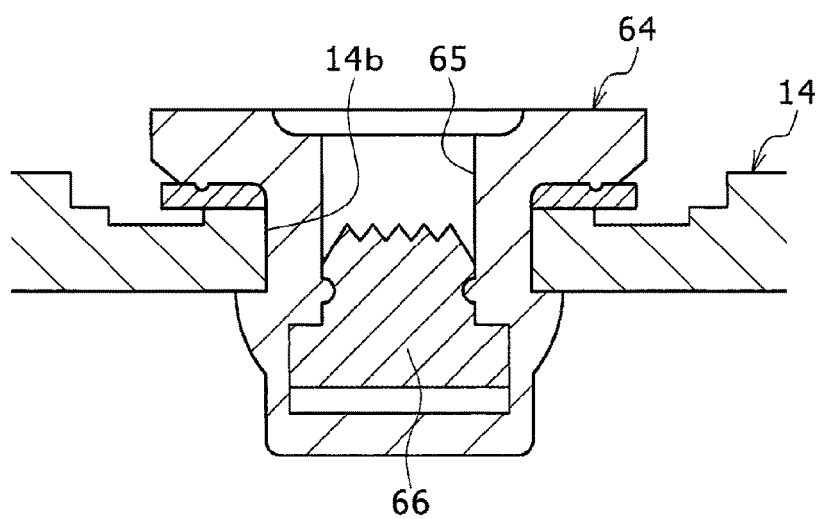
FIG. 7 is an enlarged view of a portion VII in FIG. 6.

FIG. 6 is an enlarged view of a portion VI in FIG. 5A with a rivet 64, which is a lid mounted in the liquid inlet 14b of the sealing plate 14 in FIG. 5A. FIG. 7 is an enlarged view of a portion VII in FIG. 6. As illustrated in FIG. 6 and FIG. 7, the rivet 64 is mounted in the liquid inlet 14b after the non-aqueous electrolyte solution is poured into the exterior body 12 (FIG. 1). In FIG. 1, FIG. 2, and FIG. 5A, the rivet 64 is omitted. The rivet 64 closes the opening of the liquid inlet 14b. In this state, a lower end portion of the rivet 64, which is an inner end portion, protrudes below the sealing plate 14. As illustrated in FIG. 7, an engagement hole 65 having a diameter that increases at a lower end portion thereof is formed inside the rivet 64. A shape-maintaining member 66 having high rigidity is fitted into the lower end portion of the engagement hole 65 that has the increased diameter, and a lower end portion of the shape-maintaining member 66 causes the diameter of the rivet 64 to increase at the lower end portion of the rivet 64. Thus, the lower end portion of the rivet 64 that has the increased diameter engages the lower surface of the sealing plate 14, and the rivet 64 is prevented from being extracted upward. In FIG. 7, a portion of the shape-maintaining member 66 that is not near an end of the rivet 64 is removed in a state where the lower end portion of the shape-maintaining member 66 causes the diameter of the rivet 64 to increase, and only the residual portion remains inside the engagement hole 65.

Figure 9:
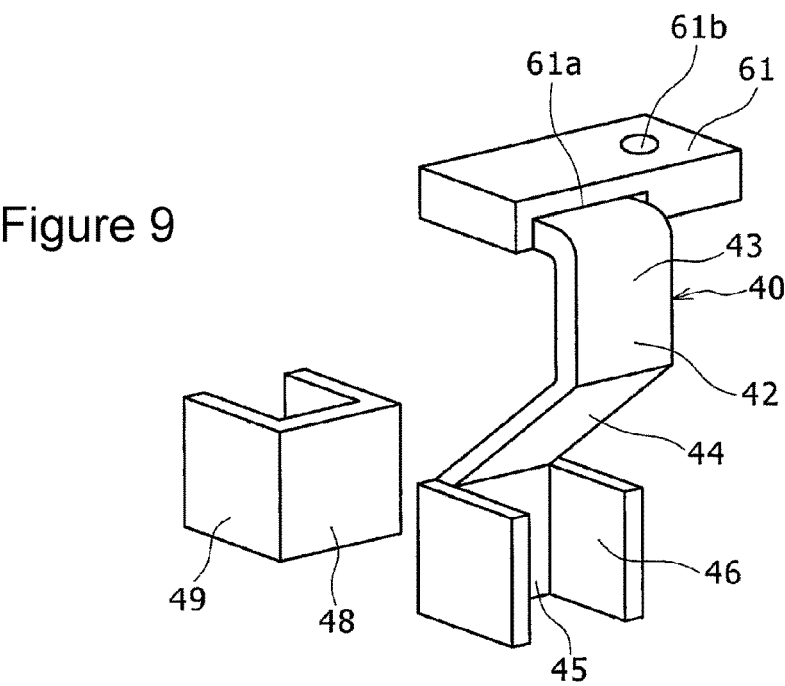
FIG. 9 is a perspective view of a combination of the positive-electrode current collector and a first insulating member, and one of the receiving members that are extracted from FIG. 5A.
Figure 10:
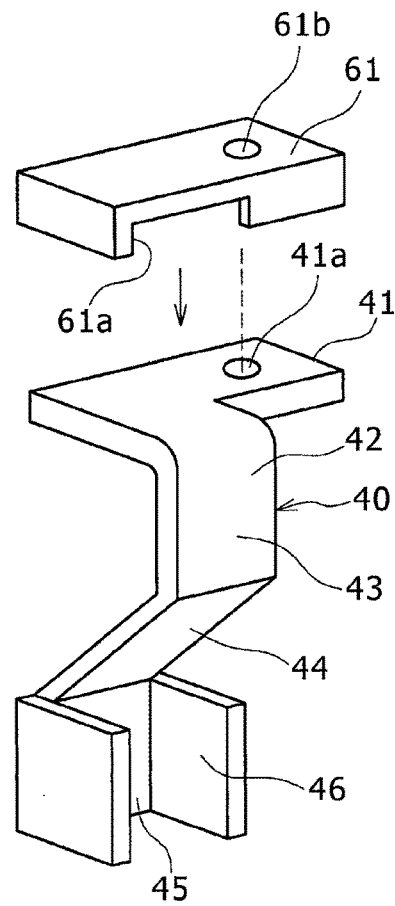
FIG. 10 is an exploded perspective view of the combination of the positive-electrode current collector and the first insulating member in FIG. 9.

The positive-electrode current collector 40 and the negative-electrode current collector 50 will now be described in detail. FIG. 8A illustrates the electrode body 20 and other components in FIG. 2 from the right-hand side. FIG. 8B illustrates the electrode body 20 and other components in FIG. 2 from the left-hand side. FIG. 9 is a perspective view of a combination of the positive-electrode current collector and the first insulating member, and the receiving member that are extracted from FIG. 5A. FIG. 10 is an exploded perspective view of the combination of the positive-electrode current collector and the first insulating member of FIG. 9.

The positive-electrode current collector 40 is made of aluminum or aluminum alloy. The negative-electrode current collector 50 is made of copper or copper alloy. The basic shape of the positive-electrode current collector 40 and the negative-electrode current collector 50 is substantially the same, and the positive-electrode current collector 40 is mainly described below. As illustrated in FIG. 8A, FIG. 9, and FIG. 10, the positive-electrode current collector 40 includes the first base 41 (FIG. 10) disposed near the sealing plate 14 and a first lead 42 that is connected to an end portion of the first base 41 and that extends downward toward the electrode body 20. The first base 41 has a rectangular plate shape and is disposed substantially parallel to and along the sealing plate 14. The first base 41 has a through-hole 41a extending in the vertical direction. The first lead 42 includes a vertically extending portion 43 that extends in the vertical direction from an end in the width direction of a side portion (left-hand side portion in FIG. 10) of the first base 41 in the longitudinal direction, a first inclined portion 44, and an electrode body joint 45. The first inclined portion 44 is inclined in the thickness direction (left and right direction in FIG. 8A, FIG. 9, and FIG. 10) of the electrode body 20 from the lower end of the vertically extending portion 43. The electrode body joint 45 extends in the vertical direction from the lower end of the first inclined portion 44 and faces a side surface (right-hand side surface in FIG. 8A) of the electrode body 20 in the thickness direction. Ribs 46 are connected to both ends of the electrode body joint 45 in the width direction. The two ribs 46 are formed so as to extend substantially perpendicular to the electrode body joint 45. The electrode body joint 45 faces the side surface (right-hand side surface in FIG. 8A) of the exposed positive-electrode core portion 23 of the electrode body 20 in the thickness direction and is electrically connected thereto by welding together with the positive-electrode receiving member 48. Ribs 49 are connected to both ends of the positive-electrode receiving member 48 in the width direction as in the case of the electrode body joint 45. In this case, an insulating film 47a is disposed between the electrode body joint 45 and the exposed positive-electrode core portion 23, and the insulating film 47b is disposed between the exposed positive-electrode core portion 23 and the positive-electrode receiving member 48. In FIG. 5A and FIG. 5B, the insulating films 47a and 47b are illustrated as hatched portions.

The insulating films 47a and 47b each have a circular hole. The electrode body joint 45, the exposed positive-electrode core portion 23 (FIG. 8A), and the positive-electrode receiving member 48 are electrically connected to each other via the holes of the insulating films 47a and 47b. In this case, a protrusion that protrudes toward the exposed positive-electrode core portion may be formed on the electrode body joint 45 at a joint between the electrode body joint 45 and the exposed positive-electrode core portion 23.

As illustrated in FIG. 6 and FIG. 9, the first base 41 of the positive-electrode current collector 40 is covered by the inside of the first insulating member 61. More specifically, the upper surface and side surfaces of the first base 41 are covered by the first insulating member 61. The lower surface of the first base 41, which is not covered by the first insulating member 61, is substantially parallel to the electrode body 20 and flush with the lower end portion of the first insulating member 61. The first insulating member 61 is disposed between the sealing plate 14 and the first base 41 to insulate the positive-electrode current collector 40 and the sealing plate 14 from each other. The first insulating member 61 has a box shape having an opening at the lower end. The first lead 42 extends from the end portion of the first base 41 toward the outside via a notch 61a formed in an end (end on the front side of the page in FIG. 9) of the first insulating member 61 in the width direction.

A hole 61b is formed in the vertical direction through the top surface of the first insulating member 61. The lower end portion of the positive terminal 15 illustrated in FIG. 6 extends through the holes of the first insulating member 61 and the first base 41 and protrudes below the first base 41, and a portion protruding below the first base 41 is crimped and electrically connected to the first base 41. The crimped portion of the positive terminal 15 is preferably connected to the first base 41 by welding. It is preferable that a recessed portion be formed on the lower surface of the first base 41, and the crimped lower end portion of the positive terminal 15 be accommodated in the recessed portion. The lower end of the crimped portion of the positive terminal 15 is preferably located above the lower surface of the first base 41.

As illustrated in FIG. 3, the insulating tape 60, which is attached to the end portion of the electrode body 20 on the end side of winding, is located on the end portion of the electrode body 20 facing the sealing plate and at least between the electrode body 20 and the end portion (left end portion in FIG. 6) of the first base 41 (FIG. 6) on the central side in the longitudinal direction of the sealing plate 14. The insulating tape 60 preferably has a puncture strength of 800 gf or more. The puncture strength is a strength obtained in a puncture strength test defined by JIS. Specifically, in the puncture strength test, test pieces, each of which as a width of 30 mm in a machine direction (MD) are sampled from an original sample over the entire width. One of the test piece is measured at 20 points at equal intervals in the width direction. When the test piece is punctured with a needle having an end shape of R=0.5 mm at a speed of 1.5 mm/sec, a load that causes the test piece to break is measured, and the average load at the 20 points is regarded as the puncture strength.

As illustrated in FIG. 8B, the negative-electrode current collector 50 includes the second base 51 and a second lead 52. The second base 51 is disposed along the sealing plate 14 as in the case of the first base 41 of the positive-electrode current collector 40. The second lead 52 is connected to an end portion of the second base 51 and extends toward the electrode body 20 as in the case of the first lead 42 of the positive-electrode current collector 40. An electrode body joint 55 of the second lead 52 faces the side surface (left-hand side surface in FIG. 8B) of the exposed negative-electrode core portion 27 of the electrode body 20 in the thickness direction and is connected to the exposed negative-electrode core portion 27. The position of a joint between the second base 51 and the second lead 52 of the negative-electrode current collector 50 is opposite of the case of a joint between the first base 41 and the first lead 42 of the positive-electrode current collector 40 with respect to the longitudinal direction (left and right direction in FIG. 2) of the sealing plate 14. The other structures of the negative-electrode current collector 50 are the same as the positive-electrode current collector 40. For example, the second lead 52 in FIG. 8B includes a vertically extending portion 53 and a second inclined portion 54 that is inclined from the lower end of the vertically extending portion 53 in the thickness direction of the electrode body 20. The upper surface and side surfaces of the second base 51 of the negative-electrode current collector 50 are covered by the second insulating member 62. The lower surface of the second base 51 is not covered by the second insulating member 62 but is exposed. The lower surface of the second base 51 is substantially parallel to the electrode body 20 and flush with the lower end portion of the second insulating member 62. The lower end portion of the negative terminal 16 extending through the second insulating member 62 and the second base 51 is electrically connected to the second base 51. The second insulating member 62 is disposed between the sealing plate 14 and the second base 51 to insulate the negative-electrode current collector 50 and the sealing plate 14 from each other. An insulating film 57a is disposed between the electrode body joint 55 of the negative-electrode current collector 50 and the exposed negative-electrode core portion 27, and the insulating film 57b is disposed between the exposed negative-electrode core portion 27 and the negative-electrode receiving member 58. The electrode body joint 55 of the negative-electrode current collector 50, the exposed negative-electrode core portion 27, and the negative-electrode receiving member 58 are electrically connected to each other via holes of the insulating films 57a and 57b.

As illustrated in FIG. 3, a positive-electrode-side interval d1 corresponds to a distance between the end portion of the electrode body 20 facing the sealing plate 14 and the surface of the first base 41 facing the electrode body 20 at the end portion (left end portion in FIG. 3) of the first base 41 of the positive-electrode current collector 40 on the central side in the longitudinal direction of the sealing plate 14. A negative-electrode-side interval d2 corresponds to a distance between the end portion of the electrode body 20 facing the sealing plate 14 and the surface of the second base 51 facing the electrode body 20 at the end portion (right end portion in FIG. 3) of the second base 51 of the negative-electrode current collector 50 on the central side in the longitudinal direction of the sealing plate 14. The thickness of the first base 41 is larger than the thickness of the second base 51. The positive-electrode-side interval d1 is less than the negative-electrode-side interval d2 (d1<d2). The height (length in the vertical direction in FIG. 3) of the first insulating member 61 around the first base 41 is larger than the height of the second insulating member 62 around the second base 51 accordingly.

In the case where the positive-electrode current collector 40 is made of aluminum or aluminum alloy, and the negative-electrode current collector 50 is made of copper or copper alloy, the internal resistance of the prismatic secondary battery can be decreased in a manner in which the thickness of a plate material for forming the positive-electrode current collector 40 is increased, and in this case, the workability of each current collector is not decreased or the weight of the secondary battery 10 is decreased. From this viewpoint, it is preferable that the plate material for forming the positive-electrode current collector 40 and a plate material for forming the negative-electrode current collector 50 do not have the same thickness, but the thickness of the plate material for forming the positive-electrode current collector 40 be larger than the thickness of the plate material for forming the negative-electrode current collector 50. Accordingly, the above relationship of d1<d2 preferably holds.

Figure 11:
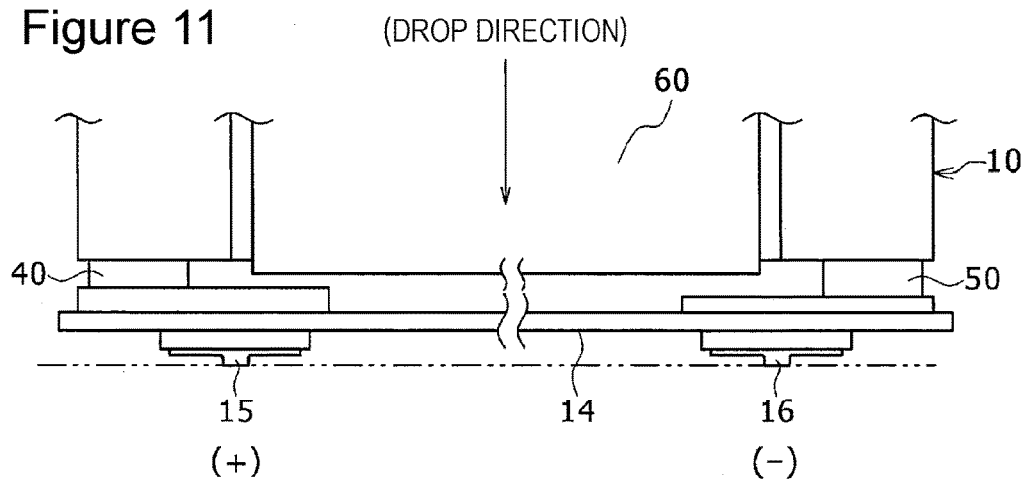
FIG. 11 is a diagram that corresponds to FIG. 3 and illustrates a state just before a secondary batter collides with a horizontal surface when the secondary battery is dropped in a drop test.

FIG. 11 illustrates a state where the secondary battery 10 is dropped with the positive terminal 15 and the negative terminal 16 facing downward, and the state is illustrated with the exterior body 12 (FIG. 1) removed. The current collectors 40 and 50 do not need to have a complex structure such as a bifurcation, and the weight of the secondary battery 10 can be decreased. The structure of each current collector can be simplified and an increase in the cost of the secondary battery 10 can be suppressed. A decrease in the energy density can be suppressed as described later.

The sum of the mass of the electrode body 20 and the mass of the non-aqueous electrolyte solution contained in the electrode body 20 is determined to be 200 g or more. This achieves a high battery capacity.

According to the embodiment, high performance due to such a high battery capacity and an improved drop resistance when the secondary battery 10 is dropped, that is, an improvement in the ability to withstand when the secondary battery 10 is dropped can both be achieved while an increase in the cost and a decrease in the energy density are suppressed.

Specifically, the secondary battery 10, in the case where the secondary battery is used for a vehicle such as a hybrid vehicle, is required to have a large capacity to achieve high performance of the vehicle. An increase in the capacity of the secondary battery 10 increases the weight of the electrolyte body 20. Conventionally, to take a countermeasure for this, each current collector is bifurcated, and the electrode body 20 is supported by two arms. However, the countermeasure needs a complex shape, and there are problems in that the weight of the secondary battery 10 increases, and the cost increases. The present invention can solve such problems.

According to the embodiment, the insulating tape 60, which is a tape for securing the winding of the wound electrode body 20, doubles as the insulating buffer. Accordingly, processes of manufacturing the secondary battery 10 are not complex, the energy density of the secondary battery 10 is not decreased, and reliability can be improved. In addition, the insulating tape 60 is interposed between the positive-electrode current collector 40 and the electrode body 20 and between the sealing plate 14 and the electrode body 20. Thus, even when the first base 41 of the positive-electrode current collector 40, which is nearer than the second base 51 of the negative-electrode current collector 50 to the wound electrode body 20, collides with the electrode body 20, the insulating tape 60 absorbs an impact at this time. This improves the drop resistance and suppresses an internal short circuit. For this reason, the secondary battery 10 have high reliability and enables high performance due to a large battery capacity and an improvement in the drop resistance, which is one of problems of secondary batteries. The sum of the mass of the electrode body 20 and the mass of the non-aqueous electrolyte solution contained in the electrode body 20 is not limited to 200 g or more and may be 200 g or less. Also in this case, an increase in the cost of the secondary battery and a decrease in the energy density can be suppressed, and an internal short circuit when the secondary battery is dropped can be suppressed. According to the present invention, in the case where the sum of the mass of the electrode body 20 and the mass of the non-aqueous electrolyte solution contained in the electrode body 20 is 200 g or more, a profound effect is achieved.

As illustrated in FIG. 6 and FIG. 7, the lower surface (lower end of a bottom portion) of the rivet 64, which is a lid that closes the liquid inlet 14b of the sealing plate 14, is preferably nearer than the lower surface (lower end of a bottom portion) of the first base 41 of the positive-electrode current collector 40 to the electrode body 20. With such a structure, the lower surface of the rivet 64 is likely to collide with the electrode body 20 earlier than the first base 41 when the secondary battery 10 is dropped with the positive terminal 15 and the negative terminal 16 facing downward. This enables a location from which a force is applied to the electrode body 20 when the secondary battery 10 is dropped to be shared between the first base 41 of the positive-electrode current collector 40 and the rivet 64 and enables a force applied from the first base 41 to be decreased. Thus, the drop resistance can be further improved. The lower surface of the rivet 64 is preferably flat. It is preferable that the lower surface of the rivet 64 have neither a positive polarity nor a negative polarity. The liquid inlet 14b and the rivet 64, which is a lid thereof, are preferably disposed nearer than the gas exhausting valve 14a to the first base 41 of the positive-electrode current collector 40 in the longitudinal direction of the sealing plate 14.

The lower surface of the first base 41 is preferably flush with the lower end of the first insulating member 61 disposed between the first base 41 and the sealing plate 14 in the vertical direction. The lower end of the first insulating member 61 disposed between the first base 41 and the sealing plate 14 is more preferably located below the lower surface of the first base 41. With such a structure, a location from which a force is applied to the electrode body 20 when the secondary battery 10 is dropped with the positive terminal 15 and the negative terminal 16 facing downward can be shared between the first base 41 of the positive-electrode current collector 40 and the first insulating member 61, and a force applied from the first base 41 can be decreased. Thus, the drop resistance can be further improved.

Figure 12:
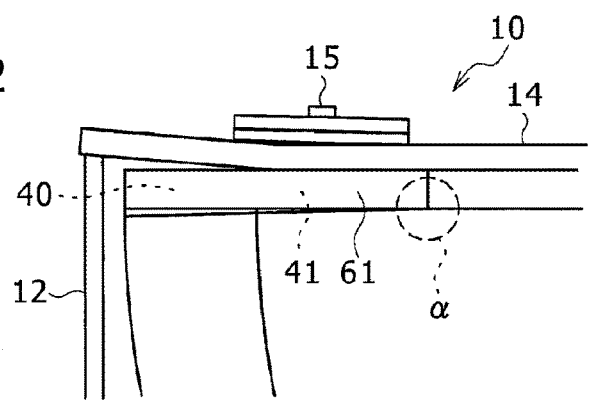
FIG. 12 illustrates a state of the vicinity of a first base of the positive-electrode current collector after the drop test in which the secondary battery is dropped with the positive terminal and the negative terminal facing downward.

FIG. 12 illustrates a state of the vicinity of the first base of the positive-electrode current collector after a drop test in which the secondary battery 10 is dropped with the positive terminal 15 and the negative terminal facing downward. The state of the vicinity of the first base of the positive-electrode current collector after the drop test is checked in a manner in which a picture of the secondary battery 10 is taken with an X-ray CT apparatus. As illustrated in FIG. 12, it can be seen that, when the secondary battery is dropped, the positive-electrode current collector 40 deforms due to the weight of the electrode body 20, the electrode body 20 move toward the sealing plate 14, and a corner of the first base 41 of the positive-electrode current collector 40 consequently collides with the upper surface of the electrode body 20 at a location denoted by a dashed line α. It can also be seen that, when the secondary battery is dropped, the positive terminal 15 and the negative terminal 16 collide with a floor surface, portions of the sealing plate 14 near locations at which the positive terminal 15 and the negative terminal 16 are mounted deform, and consequently, a corner of the first base 41 of the positive-electrode current collector 40 is likely to come into contact with the electrode body 20.

As described below, an impact of the drop can be effectively reduced in a manner in which the thickness and width (dimension in left and right direction in FIG. 2) of the electrode body 20 are increased, and the drop resistance can be improved.

Specifically, the thickness of the electrode body 20 is preferably 10 mm or more, more preferably 14 mm or more in a state where the non-aqueous electrolyte solution is contained. In the case where the preferably structure is used, the area of contact between the electrode body 20 and a component near the sealing plate 14, for example, the first base 41 can be increased, and an impact pair unit area when the electrode body 20 comes into contact with a component near the sealing plate can be reduced. For this reason, the wound electrode body 20 can be unlikely to damage. The thickness of the electrode body 20 is preferably 30 mm or less in a state where the non-aqueous electrolytes solution is contained.

The width of the wound electrode body 20 is preferably 100 mm or more. In the case where the preferable structure is used, the weight of the electrode body 20 per unit width can be decreased, and an impact per unit area when the electrode body 20 comes into contact with a component near the sealing plate can be reduced. For this reason, the wound electrode body 20 can be unlikely to damage. The width of the wound electrode body 20 is preferably 200 mm or less.

The upper end portion of the electrode body 20 facing the sealing plate has an arc shape in section. A stress when the secondary battery is dropped and a component near the sealing plate collides can be distributed more effectively as the radius of curvature of the arc shape increases. This makes the electrode body 20 unlikely to damage.

The result of drop tests conducted with secondary batteries in examples 1 to 3 and a secondary battery in a comparative example 1 will now be described.

Common conditions in the drop tests will be described below.

The structure of the secondary batteries is as follows.

In the positive-electrode sheet, positive electrode active material layers were formed on both surfaces of a positive-electrode core formed of an aluminum foil. Each of the positive electrode active material layers contained a positive electrode active material of $LiNi_{0.35}Co_{0.35}Mn_{0.30}O_2$, a carbon material as a conductive material, and a binder of polyvinylidene fluoride (PVDF). The content (mass %) was $LiNi_{0.35}Co_{0.35}Mn_{0.30}O_2$/carbon material/PVDF=90/7/3.

In the negative-electrode sheet, negative electrode active material layers were formed both surfaces of a negative-electrode core formed of a copper foil. Each of the negative electrode active material layers contained graphite, carboxymethyl cellulose (CMC), and styrene-butadiene rubber (SBR). The content (mass %) was graphite/CMC/SBR=98/1/1.

Each separator 30 had a three-layer structure of polypropylene (PP)/polyethylene (PE)/polypropylene (PP).

The non-aqueous electrolyte solution contained a mixed solvent of ethylene carbonate (EC)/ethyl methyl carbonate (EMC)/diethyl carbonate (DMC)=30/30/40 vol % and a solute of $LiPF_6$ dissolved in the mixed solvent at 1.2 M.

The positive-electrode current collector 40 was formed of aluminum. The negative-electrode current collector 50 was formed of copper.

Drop Test

In the drop tests, each secondary battery 10 was released and dropped from a height of 1.4 m with the positive terminal 15 and the negative terminal 16 facing downward. At this time, the environmental temperature was 25° C.

of the first base 41 of the positive-electrode current collector 40 was larger than the thickness of the second base 51 of the negative-electrode current collector 50. That is, the distance between the first base 41 of the positive-electrode current collector 40 and the electrode body 20 was shorter than the distance between the second base 51 of the negative-electrode current collector 50 and the electrode body 20.

In each secondary battery 10 in examples 1 to 3 and the secondary battery in comparative example 1, the lower end portion of the first insulating member 61 disposed between the sealing plate 14 and the first base 41 of the positive-electrode current collector 40 and the lower surface of the first base 41 of the positive-electrode current collector 40 had the same height.

In Table 1, the result of the drop tests is represented by "POOR" in the case where a short circuit occurred and by "GOOD" in the case where no short circuit occurred.

As illustrated in Table 1, in examples 1 to 3 in which the PP tape was used as the insulating buffer, no short circuit occurred during the drop tests even in the case where the first base 41 on the positive-electrode side and the second base 51 on the negative-electrode side were asymmetric (that is, distances from the electrode body were different), and the first base 41 was nearer than the second base 51 to the electrode body 20.

Each secondary battery 10 was dismantled to observe how far a dent extends in the electrode body 20. The observation revealed that the dent extends up to the separator between the outermost negative-electrode sheet and the outermost positive-electrode sheet.

TABLE 1

| | INSULATING BUFFER | THICKNESS OF ELECTRODE BODY (mm) | SUM OF MASS OF ELECTRODE BODY AND ELECTROLYTE SOLUTION (g) | PUNCTURE STRENGTH (gf) | DROP TEST RESULT GOOD: PRESENCE OF SHORT CIRCUIT POOR: ABSENCE OF SHORT CIRCUIT |
|---|---|---|---|---|---|
| EXAMPLE 1 | PP TAPE (150 μm) | 17.5 | 240 | 800 | GOOD |
| EXAMPLE 2 | PP TAPE (150 μm) | 17.0 | 240 | 800 | GOOD |
| EXAMPLE 3 | PP TAPE (150 μm) | 17.5 | 200 | 800 | GOOD |
| COMPARATIVE EXAMPLE 1 | — | 17.5 | 240 | — | POOR |

Table 1 illustrates the kind of the insulating buffer disposed between the first base 41 of the positive-electrode current collector 40 and the electrode body 20, the thickness of the electrode body 20 with the non-aqueous electrolyte solution contained, and the puncture strength of the insulating buffer.

The insulating tape 60 was a PP tape having a thickness of 150 μm and a puncture strength of 800 gf, and was used as the insulating buffer for each secondary battery 10 in examples 1 to 3. In the PP tape, an adhesive layer was formed on a surface of a nonporous base made of polypropylene.

In each secondary battery 10 in examples 1 to 3, the lower surface of the rivet 64 was located below the lower surface of the first base 41 of the positive-electrode current collector 40 (nearer to the electrode body 20).

In each secondary battery 10 in examples 1 to 3 and the secondary battery in comparative example 1, the thickness In contrast, in comparative example 1, a short circuit occurred during the drop test in the case where the first base 41 on the positive-electrode side and the second base 51 on the negative-electrode side were asymmetric (that is, distances from the electrode body were different), and the first base 41 was nearer than the second base 51 to the wound electrode body 20, because an insulating buffer, such as a PP tape, which differs from each separator was not used.

In the case of the same-type secondary battery in which the sum of the mass of the electrode body 20 and the mass of the non-aqueous electrolyte solution contained in the electrode body was 180 g, it was confirmed that no internal short circuit occurred when the same drop test was conducted even in the case where an insulating buffer that differs from each separator was not used.

Accordingly, it can be thought that a short circuit when the secondary battery is dropped is likely to occur in the case where the sum of the mass of the wound electrode body 20 and the mass of the non-aqueous electrolyte solution contained in the electrode body is increased to a certain extent, particularly, in the case where the sum of the mass of the wound electrode body 20 and the mass of the non-aqueous electrolyte solution contained in the electrode body is 200 g or more. A short circuit when the secondary battery is dropped is a problem that is likely to occur in the case where the distance between the first base 41 of the positive-electrode current collector 40 and the electrode body 20 is shorter than the distance between the second base 51 or the negative-electrode current collector 50 and the electrode body 20. Accordingly, it can be thought that the effect achieved by using the insulating buffer that differs from each separator is particularly profound in the case where the sum of the mass of the wound electrode body 20 and the mass of the non-aqueous electrolyte solution contained in the electrode body is 200 g or more, and the distance between the first base 41 of the positive-electrode current collector 40 and the electrode body 20 is shorter than the distance between the second base 51 of the negative-electrode current collector 50 and the electrode body 20.

The thickness of the first base 41 of the positive-electrode current collector 40 is preferably equal to or larger than 1.2 times the thickness of the second base 51 of the negative-electrode current collector 50. With the preferable structure, the effect achieved by disposing the insulating tape 60 between the first base 41 and the electrode body 20 is profound.

Although the insulating tape 60 may be attached to the electrode body 20 as in the above embodiment, the insulating tape 60 may be attached to, for example, a lower portion of the first base 41 of the positive-electrode current collector 40 and interposed between the first base 41 and the electrode body 20. The insulating tape 60 is preferably attached to a wide range of an upper portion of the electrode body 20 as in the embodiment. Since a short circuit is likely to occur near the positive-electrode current collector 40, the insulating tape 60 may be disposed on an upper portion of the electrode body 20 including the range denoted by an arrow β in FIG. 3 and may not be disposed near the negative-electrode current collector 50. The range denoted by the arrow β is a range in the width direction (left and right direction in FIG. 3) of the electrode body 20 between two positions a predetermined length S (for example, 1 cm) away toward both sides in the width direction from a reference position of the end R of the first base 41 on the central side in the winding-axis direction of the electrode body 20.

The puncture strength of the insulating tape 60 of each secondary battery 10 in examples 1 to 3 was 800 gf. This prevents a short circuit from occurring with more certainty.

In each secondary battery 10 in examples 1 to 3, the lower surface of the rivet 64 was nearer than the lower surface of the first base 41 of the positive-electrode current collector 40 to the wound electrode body 20. This enables an impact of the drop to be distributed between the rivet 64 and the wound electrode body 20 and prevents a short circuit from occurring with more certainty. The lower surface of the rivet 64 is preferably flat. An insulating member is more preferably disposed on the lower surface of the rivet 64. For example, the lower surface of the rivet 64 is preferably coated with an insulating resin.

Table 2 below illustrates the result of drop tests conducted with each secondary battery 10 in examples 4 to 6 and a secondary battery in comparative example 2. The drop tests were conducted in the same manner as above. Each secondary battery 10 in examples 4 to 6 had the same structure as in example 1 except that a nonporous PP film was used as the insulating buffer instead of the PP tape. Each secondary battery 10 in examples 4 to 6 used different PP films. The secondary battery 10 in comparative example 2 had the same structure as in example 1 except that a separator having a three-layer structure of PP/PE/PP was used instead of the insulating buffer.

TABLE 2

| | DISPOSED COMPONENT | THICKNESS OF INSULATING BUFFER (μm) | PUNCTURE STRENGTH OF INSULATING BUFFER (gf) | DROP TEST RESULT |
|---|---|---|---|---|
| EXAMPLE 4 | PP FILM A | 150 | 800 | GOOD |
| EXAMPLE 5 | PP FILM B | 30 | 1100 | GOOD |
| EXAMPLE 6 | PP FILM C | 60 | 2200 | GOOD |
| COMPARATIVE EXAMPLE 2 | SEPARATOR | 20 | 400 | OK |

As illustrated in Table 2, it can be confirmed that the drop resistance can be good also in the case of using the PP films. The puncture strength of the insulating buffer is preferably 800 gf or more. As illustrated in Table 2, in the case where the PP/PE/PP separator having a thickness of 20 μm and a puncture strength of 400 gf was used instead of the insulating buffer, the occurrence of a short circuit can be suppressed to a certain extend but cannot be prevented with certainty. In Table 2, the result of the drop tests is represented by "OK" in the case where the occurrence of a short circuit was suppressed to a certain extend.

The thickness of the insulating buffer is preferably 10 μm or more, more preferably 20 μm or more. The thickness of the insulating buffer is preferably 150 μm or less, more preferably 100 μm or less, further preferably 50 μm or less.

A PP film with an adhesive on a surface thereof may be used as the insulating buffer. In this case, the PP film can be used as the insulating tape 60 for securing the end of winding of the electrode body 20, which is more preferable. In the case where a film with no adhesive is used, it is thought that the film is secured to the electrode body 20 with, for example, another tape. Alternatively, it is thought that the insulating buffer is thermally welded or stuck with an adhesive to the corresponding separator 30.

The distance between the lower surface of the first base 41 of the positive-electrode current collector 40 and the upper end of the electrode body 20 is preferably 1.5 mm or more. The reason is that, in the case where the distance is shorter than 1.5 mm, an impact applied to the electrode body 20 from the positive-electrode current collector 40 when the secondary battery is dropped significantly increases.

Figure 13:
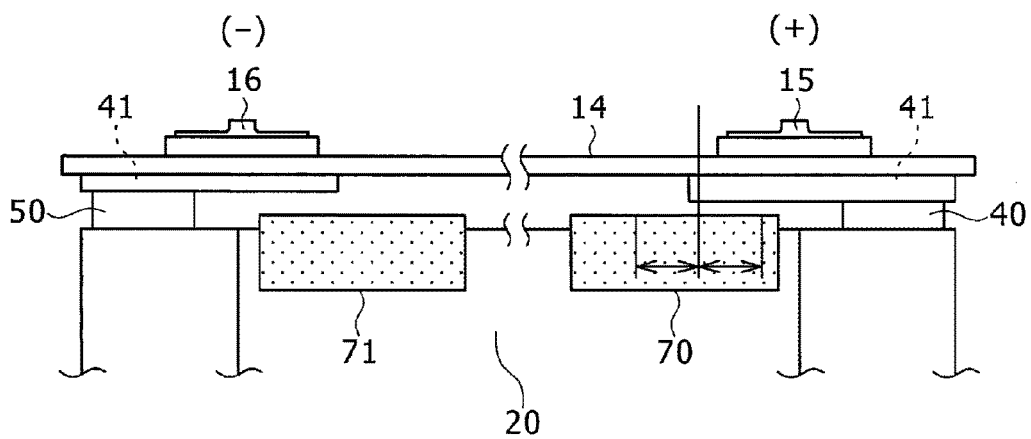
FIG. 13 is a diagram that corresponds to FIG. 3 and illustrates a non-aqueous electrolyte secondary battery according to another embodiment.

FIG. 13 is a diagram that corresponds to FIG. 3 and illustrates a secondary battery according to another embodiment. According to the embodiment illustrated in FIG. 13, the insulating tape used in the structures illustrated in FIG.

1 to FIG. 10 is divided in the width direction of the electrode body 20 into two parts of a first insulating tape 70 and a second insulating tape 71. The first insulating 70 is disposed as the first insulating buffer between the electrode body 20 and the first base 41 of the positive-electrode current collector 40. The second insulating tape 71 is disposed as the second insulating buffer between the electrode body 20 and the second base 51 of the negative-electrode current collector 50. With the structure illustrated in FIG. 13, the cost can be reduced, and an internal short circuit can be suppressed when the secondary battery is dropped as in the case of the structures illustrated in FIG. 1 to FIG. 10. In this case, the non-aqueous electrolyte solution readily enters the electrode body 20 from a location at which the insulating tapes are not disposed, and the solution can be readily poured into the electrode body 20.

The other structures and effects are the same as in the case of the structures illustrated in FIG. 1 to FIG. 10.

According to a modification to the embodiment, a part of the insulating sheet 13 covering the electrode body 20 can serve as the insulating buffer. For example, a part of the insulating sheet 13 can be disposed between the end portion of a positive-electrode base on the central side in the longitudinal direction of the sealing plate 14 and the wound electrode body 20.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A prismatic secondary battery, comprising:
   a first electrode sheet including a first exposed core portion;
   a second electrode sheet including a second exposed core portion;
   a flat wound electrode body obtained by winding the first electrode sheet and the second electrode sheet with a separator interposed therebetween and winding a separator as an outermost layer;
   a non-aqueous electrolyte solution;
   an exterior body that has an opening and that contains the wound electrode body and the non-aqueous electrolyte solution;
   a sealing plate that closes the opening;
   a first current collector connected to the first exposed core portion;
   a second current collector connected to the second exposed core portion;
   a first terminal that is connected to the first current collector and that is mounted in the sealing plate; and
   a second terminal that is connected to the second current collector and that is mounted in the sealing plate,
   wherein a winding axis of the wound electrode body is parallel to a longitudinal direction of the sealing plate,
   wherein the first exposed core portion is disposed along an end portion of the wound electrode body in a direction in which the winding axis extends, and the second exposed core portion is disposed along the other end portion,
   wherein the first current collector includes a first base disposed along the sealing plate and a first lead that is connected to an end portion of the first base and that extends toward the wound electrode body,
   wherein the second current collector includes a second base disposed along the sealing plate and a second lead that is connected to an end portion of the second base and that extends toward the wound electrode body,
   wherein the first lead is connected to the first exposed core portion,
   wherein the second lead is connected to the second exposed core portion,
   wherein a distance between an end portion of the wound electrode body facing the sealing plate and a surface of the first base facing the wound electrode body at an end portion of the first base on a central side in the longitudinal direction of the sealing plate is shorter than a distance between the end portion of the wound electrode body facing the sealing plate and a surface of the second base facing the wound electrode body at an end portion of the second base on the central side in the longitudinal direction of the sealing plate, and
   wherein an insulating buffer that differs from the separators is disposed between the wound electrode body and the surface of the first base facing the wound electrode body at the end portion of the first base on the central side in the longitudinal direction of the sealing plate.

2. The prismatic secondary battery according to claim 1, wherein a puncture strength of the insulating buffer is 800 gf or more.

3. The prismatic secondary battery according to claim 1, wherein a sum of a mass of the wound electrode body and a mass of the non-aqueous electrolyte solution contained in the wound electrode body is 200 g or more.

4. The prismatic secondary battery according to claim 1, wherein the end portion of the wound electrode body facing the sealing plate has an arc shape in section,
   wherein a thickness of the wound electrode body is no less than 10 mm and no more than 30 mm in a state where the non-aqueous electrolyte solution is contained, and
   wherein a width of the wound electrode body is no less than 100 mm and no more than 200 mm.

5. The prismatic secondary battery according to claim 1, wherein the first electrode sheet is a positive-electrode sheet,
   wherein the second electrode sheet is a negative-electrode sheet,
   wherein the first current collector is made of aluminum or aluminum alloy, and
   wherein the second current collector is made of copper or copper alloy.

6. The prismatic secondary battery according to claim 1, wherein the sealing plate has a liquid inlet through which the non-aqueous electrolyte solution is poured into the exterior body,
   wherein a lid is mounted in the sealing plate to close an opening of the liquid inlet, and
   wherein a lower surface of the lid is nearer than a lower surface of the first base to the wound electrode body.

7. The prismatic secondary battery according to claim 1, wherein a first insulating member is disposed between the sealing body and the first base, and
   wherein a second insulating member is disposed between the sealing body and the second base.

* * * * *